(12) United States Patent
Barnard et al.

(10) Patent No.: US 6,594,201 B2
(45) Date of Patent: Jul. 15, 2003

(54) SYSTEM AND METHOD FOR LOCALIZING TARGETS USING MULTIPLE ARRAYS

(75) Inventors: Thomas J. Barnard, Liverpool, NY (US); Donald W Winfield, Camillus, NY (US)

(73) Assignee: Lockheed Martin Corporation ( * ) Notice: Subject to any disclaimer, the term of this patent is extended or adjusted under 35 U.S.C. 154(b) by 0 days.

(21) Appl. No.: 10/001,618

(22) Filed: Oct. 23, 2001

(65) Prior Publication Data

US 2003/0081503 A1 May 1, 2003

(51) Int. Cl.$^7$ ............................... G01S 3/80; G01S 15/00
(52) U.S. Cl. ....................... 367/125; 367/124; 367/119; 367/129; 367/135; 342/368
(58) Field of Search .......................... 367/99, 100, 103, 367/119, 123, 124, 125, 129, 135; 342/147, 154, 308, 371, 372, 378, 407, 408, 450

(56) References Cited

U.S. PATENT DOCUMENTS

| | | | | |
|---|---|---|---|---|
| 4,162,474 A | * | 7/1979 | Broder et al. ................ | 342/378 |
| 4,170,766 A | | 10/1979 | Pridham et al. ............ | 367/135 |
| 4,207,621 A | | 6/1980 | Clearwaters et al. ........ | 367/122 |
| 4,855,961 A | * | 8/1989 | Jaffe et al. .................. | 367/101 |
| 5,392,257 A | | 2/1995 | Gilmour ..................... | 367/135 |
| 5,504,716 A | * | 4/1996 | Cotterill ..................... | 367/121 |

* cited by examiner

*Primary Examiner*—Ian J. Lobo
(74) *Attorney, Agent, or Firm*—Duane Morris LLP

(57) ABSTRACT

A system and process for localizing signals received on multiple co-linear arrays reduces the adverse effects on localization performance due to background noise. The system and process coherently combine all possible array cross-correlograms. The resulting correlogram is a function of two variables, one which corresponds to a fine bearing estimate and a second with maps into range.

21 Claims, 15 Drawing Sheets

SYSTEM AND METHOD FOR LOCALIZING TARGETS USING MULTIPLE ARRAYS

FIELD OF THE INVENTION

The present invention is generally related to signal processing, and more specifically related to correlating signals from multiple arrays.

BACKGROUND

In a typical active sonar or radar system, acoustic/electromagnetic signals are transmitted through a medium (e.g., water for sonar, air for radar) toward a target area and acoustic/electromagnetic returns (e.g., echoes) from the target area are received by receiving elements (e.g., sensors) and processed for display. In a passive system, no signals are transmitted. Rather, energy radiating from the target area is processed for display. Typically, localization of a target of interest comprises determining the range and bearing to the target.

Of particular interest is the localization of a target utilizing multiple co-linear arrays. To improve performance, multiple co-linear arrays are combined to increase the system aperture, thus extending the near field. Conventional systems form beam patterns for each linear array. The system then cross-correlates the beam data between array pairs. The system then finds the magnitude squared of the complex correlation output, and this output is non-coherently processed to form a range/bearing surface.

A disadvantage of the above approach is that noise degrades the cross-correlation process, thus detrimentally affecting detection and localization performance. Thus, a need exists for a system and method for localizing a target utilizing multiple co-linear arrays, that does not suffer the herein-described performance degradation.

SUMMARY OF THE INVENTION

A system for localizing a target using a plurality of co-linear arrays of sensors includes a beamformer, a cross-correlator, a time delayer, and a summer. The beamformer forms respective beam pattern signals for each of the plurality of arrays. The cross-correlator coherently cross-correlates the beam pattern signals for providing respective correlogram signals. The time delayer time delays each correlogram signal in accordance with a respective expected time delay. And the summer coherently sums the time delayed correlogram signals for localizing the target.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTIONS

Figure 1:
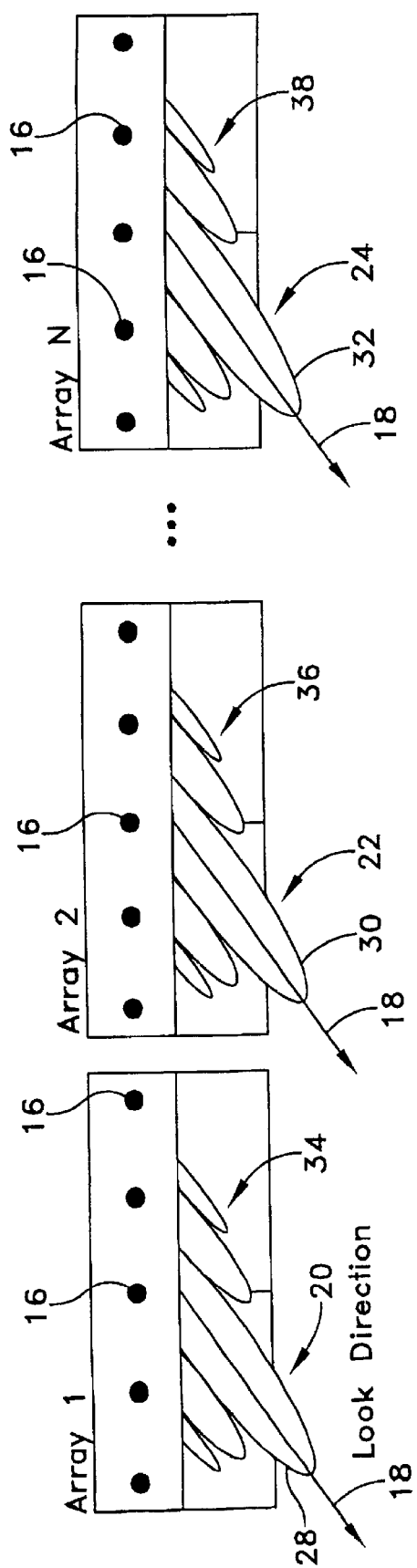
FIG. 1 is a diagram of co-linear sensor arrays, 1 through N, and respective exemplary beam patterns 20, 22, 24, in accordance with an embodiment of the present invention.

FIG. 1 is a diagram of co-linear sensor arrays, 1 through N, and respective exemplary beam patterns 20, 22, 24, in accordance with an embodiment of the present invention. Arrays 1 through N depict exemplary linear arrays of sensors. Each array (arrays 1 through N) comprises a plurality of sensor elements 16. As described herein, sensors 16 comprise acoustic transducers (e.g., sonar), which convert acoustic energy to electrical signals and electrical signals to acoustic energy. However, it is understood that the processes and systems described herein also apply to systems comprising other types of acoustic sensors (e.g., ultrasonic), electromagnetic sensors (e.g., radar) and optical sensors (e.g., infrared, ultraviolet, visible light), for example. The characteristics of received energy by a linear array, such as array 1, for example, vary with direction with respect to the alignment of the array. The variation with respect to direction (i.e., directionality) is due, in part, to the fact that energy comprising sinusoidal signals arriving from one direction tends to be in phase at all the array elements, whereas the noise background tends to be out of phase. Also, energy comprising broadband signals (signals comprising greater frequency content than a sinusoid) tends to be correlated between pairs of array elements, whereas the noise background does not tend to be correlated.

To search an area, linear arrays 1 through N can be steered toward a desired direction, referred to as the look direction, as shown by arrows 18 in FIG. 1. Steering may be accomplished mechanically or electrically. Mechanical steering is accomplished by physically rotating each array 1 through N. Electrical steering comprises applying a phase shift to sinusoidal signals and/or a time delay to broadband signals to steer the array toward the look direction 18. To steer an array in a desired look direction, beam patterns are formed and the beam pattern is electrically steered in the desired direction. Each beam pattern comprises a mainlobe and sidelobes, wherein the mainlobe is steered in the desired look direction. Thus, in FIG. 1, beam patterns 20, 22, and 24 are formed from signals provided by the sensors elements 16 for array 1, array 2, and array N, respectively. Beam pattern 20 comprises mainlobe 28 and sidelobes 34, beam pattern 22 comprises mainlobe 30 and sidelobes 36, and beam pattern 24 comprises mainlobe 32 and sidelobes 38. Beamformers are used to form beams for transmitted energy and received energy. Thus, beams are used to steer transmitted radiant energy toward a particular direction as well as receive energy from a particular direction. Steering a beam pattern comprises performing a weighted summation of time delayed and/or phase shifted signals provided by the arrays, 1 through N. The selection of specific values of time delay/phase shift and weights is based upon the direction of the desired beam relative to the array. Thus, beams are steered by the selection of the appropriate delay/phase shift values and the weights values. Combining arrays 1 through N increases the total array aperture, thus extending the near field of the total array(arrays 1 through N) to greater distances than the near field for a single array (any one of arrays 1 through N).

Figure 2:
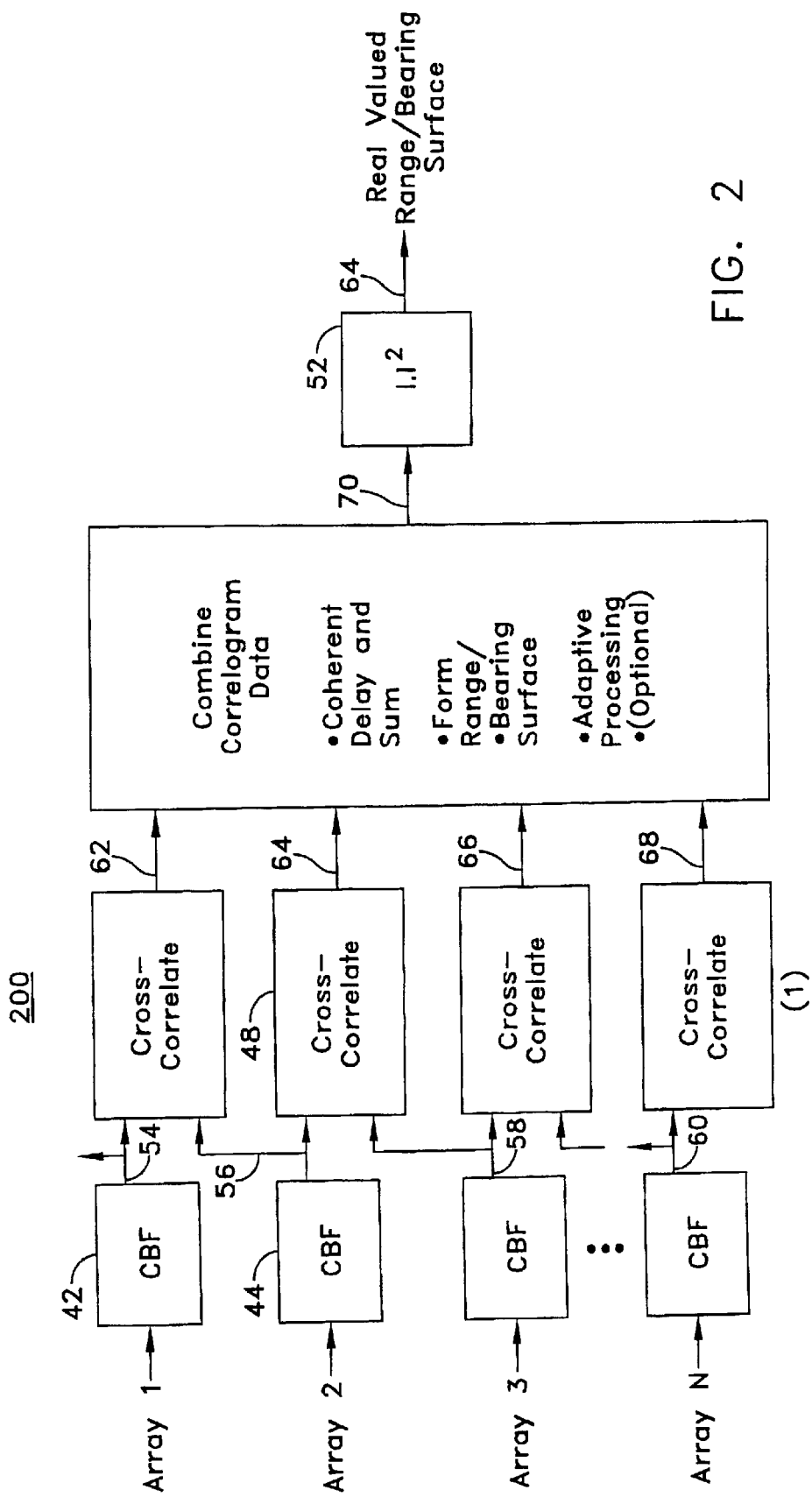
FIG. 2 is a block diagram of an exemplary system 200 for localizing a target utilizing a plurality of arrays in accordance with the present invention.

FIG. 2 is a block diagram of an exemplary system 200 for localizing a target utilizing a plurality of arrays in accordance with the present invention. Element data from each of arrays 1 through N is coherently beamformed by respective coherent beamformers (CBF). Element data from array 1 is coherently beamformed by CBF 42 and element data from array 2 is coherently beamformed by CBF 44. Each array is beamformed to be steered in a specific look direction (e.g., look direction 18 in FIG. 1). Pairs of beamformed data are cross-correlated. Cross correlation is well known in the art, a description of which is disclosed in a textbook titled, "Signal Theory and Random Process", authored by Harry Urkowitz, published by Artech House, Inc., copyright 1983. As shown in FIG. 1, beamformed data 54 is cross-correlated with beamformed data 56 by cross-correlator 46. In various embodiments of the invention, some or all pairs of array data are cross-correlated. In the embodiment of the invention depicted by system 200, consecutive pairs of beamformed array data are cross-correlated. Thus, beamformed data 54 from array 1 is cross-correlated with beamformed data 56 from array 2, beamformed data 56 from array 2 is cross-correlated with beamformed data 58 from array 3, and beamformed data 60 from array N is cross-correlated with beamformed data from array N–1 (array N–1 not shown in FIG. 2).

Each cross-correlator cross-correlates a pair of beamformed data to produce respective cross-correlograms. A correlogram is a visual representation of the results of a correlation process. The peak value of each correlogram is indicative of the difference in time between when a signal, corresponding to a common source, is received by each of the two respective arrays. This time delay is used to provide a high-resolution estimate of the bearing of the signal source. For signal sources in the near field of the multiple arrays, the time delay varies for each array pair.

Cross-correlogram data 62, 64, 66, 68, are provided to combiner 50. Combiner 50 coherently delays and sums the provided correlogram data to form a three-dimensional range/bearing surface. This complex surface then undergoes a magnitude squared operation by the magnitude calculator 52. The resulting real-valued range/bearing surface may be visualized as comprising range values on a first axis, bearing values on a second axis (the second axis being orthogonal to the first axis), and the amplitude of the received signal at the corresponding range and bearing on a third axis (the third axis being orthogonal to the first and second axes). The range/bearing surface provides information pertaining to the range and bearing of signals received from a search area. The location of a target peak in this surface this localizes that target in range and bearing.

In an alternate embodiment of the invention, the coherent delay and summation process is adaptively performed prior to computation of the complex magnitude squared process. This is accomplished with an adaptive filter tuned to the peak shape of successive instantiations of the range/bearing surface used to form the required covariance matrix.

Figure 3:
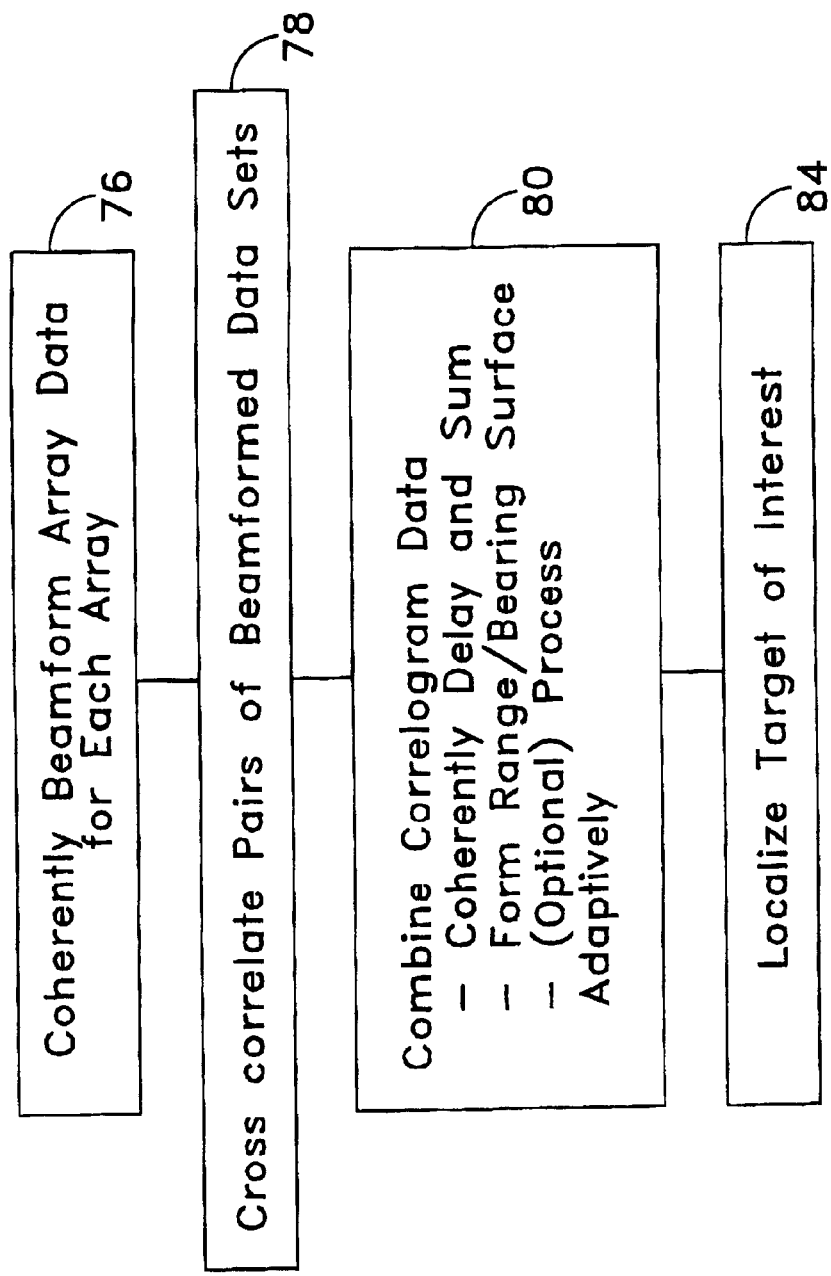
FIG. 3 is a flow diagram of a process for localizing a target in accordance with an embodiment of the present invention.

FIG. 3 is a flow diagram of an exemplary process for detecting and localizing a target in accordance with an embodiment of the present invention. An exemplary localization scenario comprises searching for a target throughout a search area (search phase) and then localizing the target, on the range/bearing surface.

Figure 4:
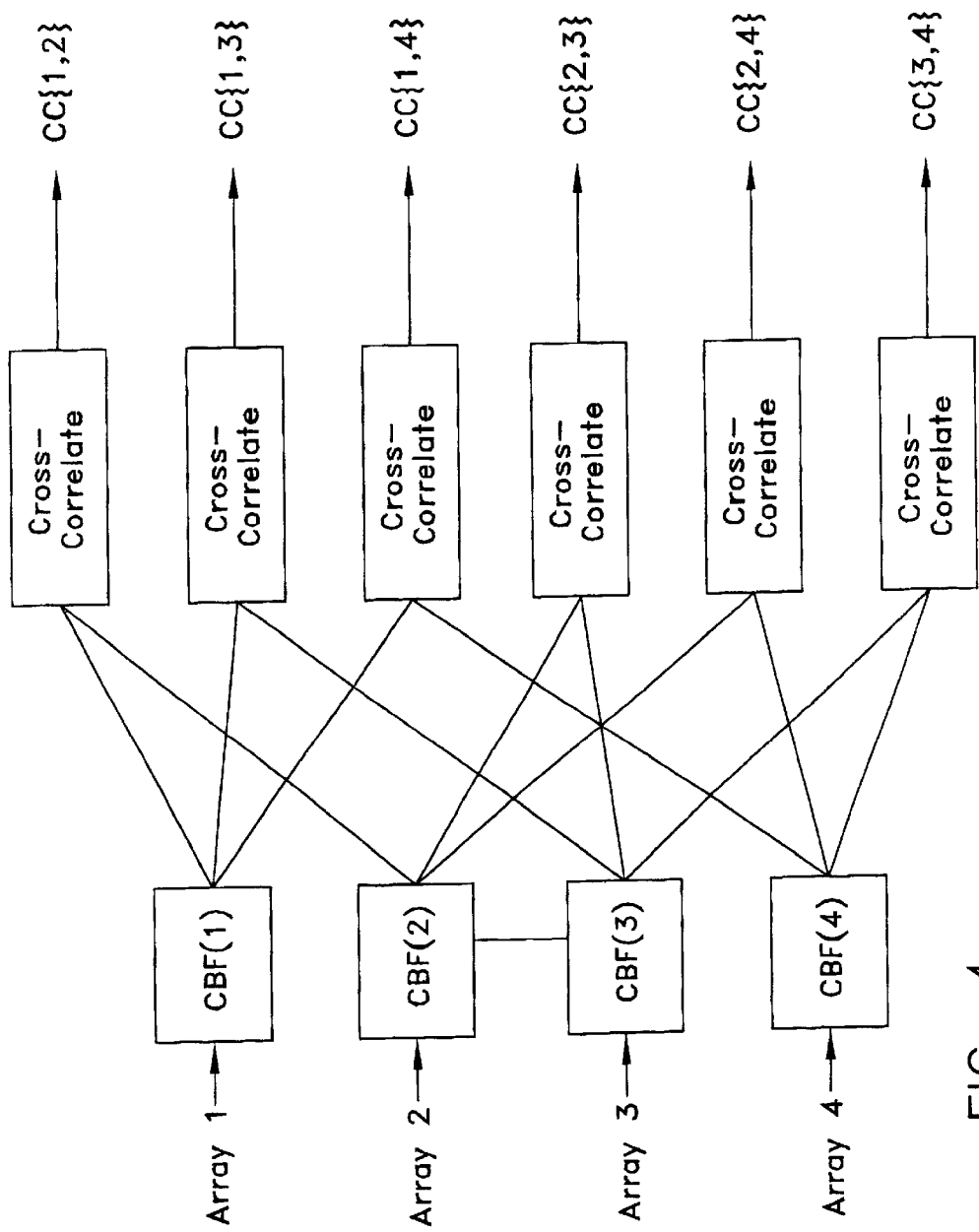
FIG. 4 is block diagram depicting the cross-correlation of combinations of co-linear array data in accordance with an exemplary embodiment of the invention.

Element data from each of arrays 1 through N (see FIG. 1) is coherently beamformed at step 76. During the search phase, the mainlobe of each beam pattern is steered to search for a target of interest. Steering may be accomplished manually (at operator discretion), and/or automatically in accordance with a predetermined search pattern. Coherently beamformed data are cross-correlated at step 78. In an exemplary embodiment of the invention, all combinations of pairs of beamformed data are cross-correlated. For example, referring to FIG. 4, assume a system in accordance with the present invention comprising four co-linear arrays, arrays 1 through 4. Each of arrays 1 through 4 is beamformed by coherent beamformers CBF(1), CBF(2), CBF(3), and CBF(4), respectively. All combinations of pairs of beamformed data are cross-correlated. Thus, as shown in FIG. 4, the resultant cross-correlations are CBF(1) cross-correlated with CBF(2) [denoted as CC{1,2}], CC{1,3}, CC{1,4}, CC{2,3}, and CC{3,4}. As evident in FIG. 4, the number of correlograms formed is in accordance with the following equation.

$$\text{Number of Correlograms} = \sum_{i=1}^{N} (N-i), \tag{1}$$

wherein, N is the number of co-linear arrays.

The correlogram data is coherently combined at step 80. The combination process comprises coherently delaying and summing the correlogram data. The amount of delay applied is in accordance with the time delay associated with the peak values of the each correlogram. A mathematical description of the combination and delay process is given with respect to a configuration comprising three co-linear arrays and a single signal source comprising a broadband signal.

Figure 5:
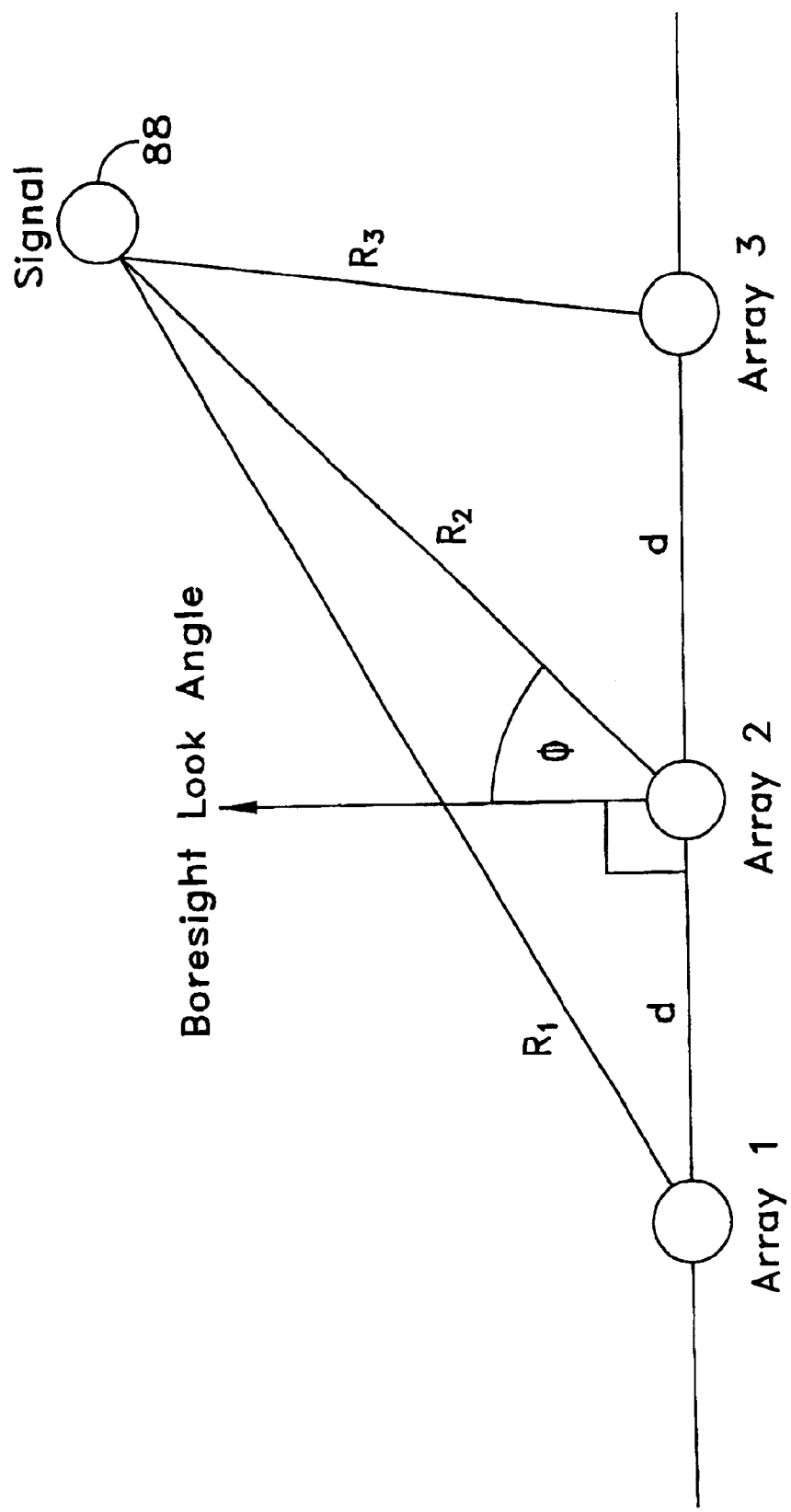
FIG. 5 is an exemplary configuration of three co-linear arrays and a signal source.

FIG. 5 is an exemplary configuration of three co-linear arrays and a signal source 88. The time delays between the arrays are designated $T_{12}$, $T_{23}$, and $T_{13}$, wherein $T_{12}$ is the difference in time between a signal from the signal source 88 being sensed by array 1 and when the same signal is sensed by array 2. Similarly, $T_{23}$ is the time delay between array 2 and array 3, and $T_{13}$ is the time delay between array 1 and array 3. The time delays are related to the ranges in accordance with the following equations.

$$T_{12} = \frac{R_1 - R_2}{C}, \quad (2)$$

$$T_{23} = \frac{R_2 - R_3}{C}, \quad (3)$$

wherein, $R_1$ is the distance (range) between array 1 and the signal source, $R_2$ is the range between array 2 and the signal source, and C is the speed of sound in the medium (e.g., sea water).

Figure 6:
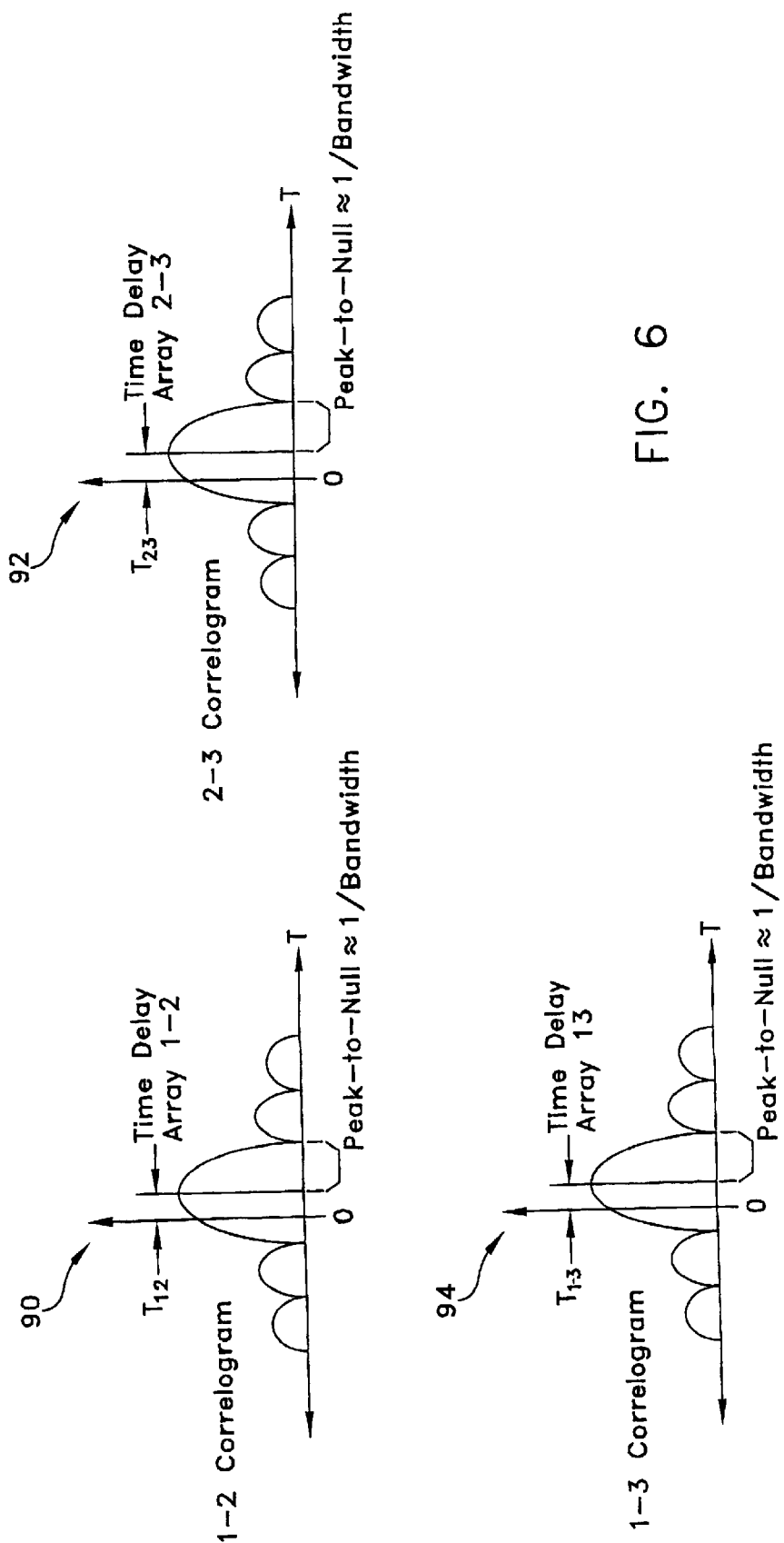
FIG. 6 is a graph of the magnitude of three correlograms in accordance with an embodiment of the present invention.

FIG. 6 is a graph of the magnitude of two exemplary correlograms in accordance with an embodiment of the present invention. Correlogram 90 is the result of cross-correlating array 1 with array 2. For spectrally flat broadband signals, the shape of the curve of correlogram 90 is the magnitude of the well-known sinc function (sin x/x). Correlogram 90 is the magnitude of the sinc function, sinc[Bw(T−$T_{12}$)]. Sinc[Bw(T−$T_{12}$)] indicates that the peak of the sinc function is centered at $T_{12}$, and that the time between the peak to the first null is equal to the inverse of the bandwidth, Bw (1/Bw). The horizontal axis, labeled T, is time delay in units of time (e.g., seconds, milliseconds). The time delay, $T_{12}$, as shown in FIG. 6, is the time delay from zero time delay to the time delay at the peak of the correlogram 90.

Correlogram 92 is the magnitude of the result of cross-correlating array 2 with array 3. Similar to correlogram 90, the shape of the curve of correlogram 92 is the magnitude of the well-known sinc function $$\left(\frac{\sin x}{x}\right).$$

Correlogram 92 is the magnitude of the sinc function, sinc[Bw(T−$T_{23}$)]. Sinc[Bw(T−$T_{23}$)] indicates that the peak of the sinc function is centered at $T_{23}$, and that the time between the peak to the first null is equal to the inverse of the bandwidth, Bw(1/Bw). The horizontal axis, labeled T, is time delay in units of time (e.g., seconds, milliseconds). The time delay, $T_{23}$, is the time delay from zero time delay to the time delay at the peak of the correlogram 92.

Correlogram 94 is the magnitude of the result of cross-correlating array 1 with array 3. Similar to correlograms 90 and 92, the shape of the curve of correlogram 94 is the magnitude of the well-known sinc function. Correlogram 94 is the magnitude of the sinc function, sinc[Bw(T−$T_{13}$)]. Sinc[Bw(T−$T_{13}$)] indicates that the peak of the sinc function is centered at $T_{13}$, and that the time between the peak to the first null is equal to the inverse of the bandwidth, Bw (1/Bw). The horizontal axis, labeled T, is time delay in units of time (e.g., seconds, milliseconds). The time delay, $T_{13}$, is the time delay from zero time delay to the time delay at the peak of the correlogram 94.

In the near field (signal source 88 is closer to the arrays 1 through 3 then the far field), the time delays, $T_{12}$, $T_{23}$, and $T_{13}$ are not equal. When the signal source 88 is in the near field, the range to the signal source 88 is determined in accordance with the difference between the time delays. As indicted in FIG. 6, the values of the time delays $T_{12}$ and $T_{23}$ differ. The difference between the time delays $T_{12}$ and $T_{23}$ is calculated in accordance with the following equation.

$$\Delta T = T_{12} - T_{23} = \frac{R_1 + R_3 - 2R_2}{C} \quad (4)$$

wherein, $\Delta T$ is the time difference between time delays $T_{12}$ and $T_{23}$.

Referring again to FIG. 5, applying the law of cosines to the geometry of the configuration in FIG. 5, it can be shown that:

$$R_1^2 = d_2 + R_2^2 + 2d\ R_2\ \sin(\phi), \text{ and} \quad (5)$$

$$R_3^2 = d_2 + R_2^2 + 2d\ R_2\ \sin(\phi), \quad (6)$$

wherein, d is the distance between the co-linear arrays; and $\phi$ is the angle, relative to boresight, to the signal source 88. As shown in FIG. 5, boresight is the angle that is perpendicular to the axis of the linear array.

The relationship between the range to the signal source 88 from array 2, $R_2$, and the difference in time delays, $\Delta T$, is determined by substituting equations (5) and (6) into equation (4). This produces the following equation.

$$\Delta T = \left(\frac{R_2}{C}\right) * \left\{ \left[\left(\frac{d}{R_2}\right)^2 + 1 - 2\left(\frac{d}{R_2}\right)\sin(\phi)\right]^{\frac{1}{2}} + \left[\left(\frac{d}{R_2}\right)^2 + 1 + 2\left(\frac{d}{R_2}\right)\sin(\phi)\right]^{\frac{1}{2}} - 2 \right\} \quad (7)$$

Equation (7) shows the relationship between the difference in time delays, $\Delta T$, and the range $R_2$. One approach for determining the range to the signal source 88, is to substitute the estimated value of $\Delta T$ (e.g., obtained from the values of $T_{12}$ and $T_{23}$ from correlograms 90 and 92) and solving for the range $R_2$. However, this approach allows noise to detrimentally affect the range estimation performance of the system. The inventors have discovered that the amount of detrimental noise is reduced, and therefore detection performance is improved, by utilizing the correlogram data from the cross-correlation between arrays 1 and 3, and performing a coherent delay and sum process, prior to the magnitude squared operation.

Figure 7:
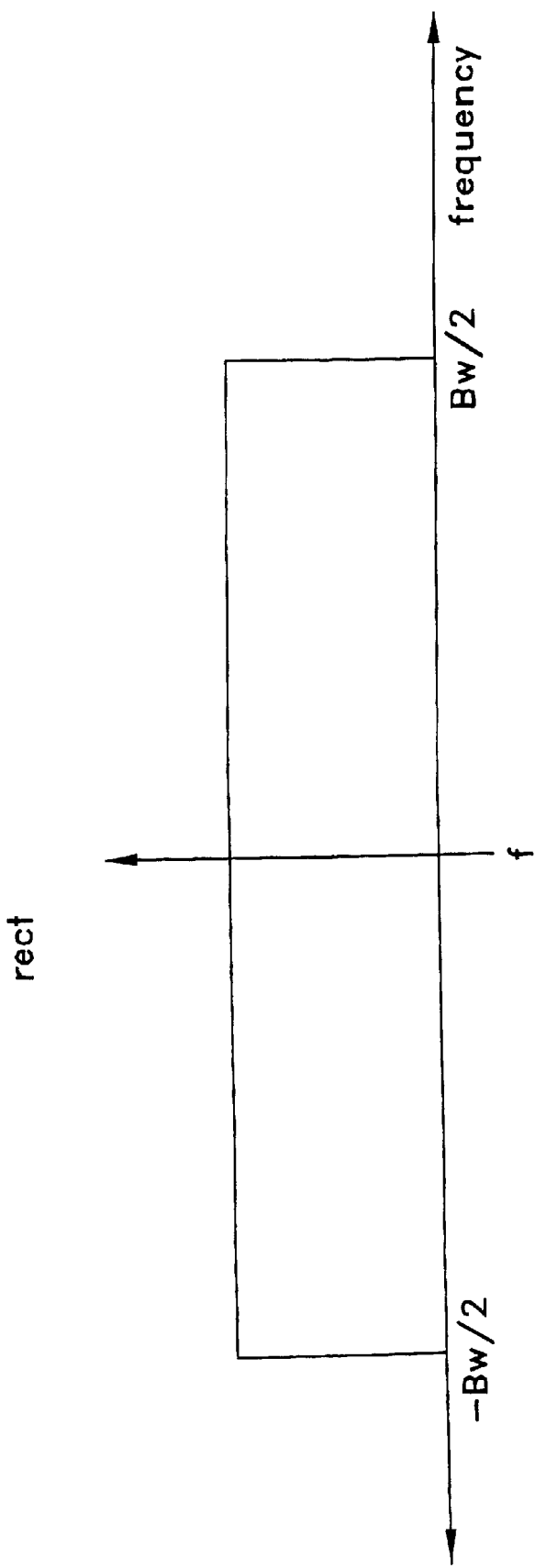
FIG. 7 is a diagram of a rectangle function in accordance with an exemplary embodiment of the present invention.

Signal source 88 comprises a broadband signal. Upon being received by the array elements, the broadband (also referred to as wideband) signal from signal source 88 is sampled, and truncated in accordance with the window function of the sampling circuitry. Assuming that the broadband signal from signal source 88 is spectrally flat, in an exemplary embodiment of the invention, the spectrally flat broadband signal is truncated in the frequency domain in accordance with a rectangle function. FIG. 7 is a diagram of an exemplary rectangle function, rect(f/Bw), in accordance with an embodiment of the present invention. The notation "rect(f/Bw)" indicates that the rectangular function is centered at f, and is symmetric about f with a total bandwidth of Bw.

The spectrum of the broadband, spectrally flat signal from signal source 88 received by arrays 1, 2 and 3, are in accordance with the following equations.

$$G_1(f) = e^{-2\pi j f T_1} * rect(f/Bw), \quad (8)$$

$$G_2(f) = e^{-2\pi j f T_2} * rect(f/Bw), \quad (9)$$

-continued $$G_3(f) = e^{-2\pi jfT_3} * rect(f/Bw), \quad (10)$$

wherein, $T_1$, $T_2$, and $T_3$ are the propagation times of the signal from the signal source 88 to arrays 1, 2, and 3, respectively; $G_1(f)$, $G_2(f)$, and $G_3(f)$ are the spectra of the signal from signal source 88 received by arrays 1, 2, and 3, respectively; and rect(f/Bw) is a rectangle function symmetric about f with a total bandwidth of Bw.

The spectra of the cross-correlation between arrays 1, 2, and 3 are in accordance with the following equations.

$$S_{12}(f) = G_1(f)G_2*(f) = e^{-2\pi jf(T_1-T_2)} * rect(f/Bw), \quad (11)$$

$$S_{23}(f) = G_2(f)G_3*(f) = e^{-2\pi jf(T_2-T_3)} * rect(f/Bw), \quad (12)$$

$$S_{13}(f) = G_1(f)G_3*(f) = e^{-2\pi jf(T_1-T_3)} * rect(f/Bw), \quad (13)$$

wherein, $S_{12}(f)$, $S_{23}(f)$, and $S_{13}(f)$ are the spectra of the cross-correlations between arrays 1 and 2, arrays 2 and 3, and arrays 1 and 3, respectively; and the asterisk "*" indicates the complex conjugate.

The cross-correlation for each pair of arrays is the inverse Fourier transform of the respective spectrum. Thus, the cross-correlations between arrays 1, 2, and 3 are in accordance with the following equations.

ti $R_{12}(T)=\text{sinc}\{Bw[T-(T_1-T_2)]\}=\text{sinc}[Bw(T-T_{12})],+\text{tm}$ (14)
ti $R_{23}(T)=\text{sinc}\{Bw[T-(T_2-T_3)]\}=\text{sinc}[Bw(T-T_{23})],+\text{tm}$ (15)
ti $R_{13}(T)=\text{sinc}\{Bw[T-(T_1-T_3)]\}=\text{sinc}[Bw(T-T_{13})],+\text{tm}$ (16)

wherein, $R_{12}(T)$, $R_{23}(T)$, and $R_{13}(T)$ are the cross-correlations between arrays 1 and 2 arrays 2 and 3, and arrays 1 and 3, respectively; and sinc[Bw(T–$T_{12}$)], sinc[Bw(T–$T_{23}$)], and sinc[Bw(T–$T_{13}$)] indicate that the peaks of the sinc functions are centered at $T_{12}$, $T_{23}$, $T_{13}$, respectively; and that the time between the peak to the first null of each sinc function is equal to the inverse of the bandwidth of the rectangle function.

Not represented in equations (14), (15), and (16) are sources of independent noise on the arrays. This noise is present in practical situations, and tends to degrade the detection performance of the system. However, a system and process in accordance with the present invention, tend to decrease this noise and decrease the performance degradation due to this noise. To accomplish this, it is advantageous to rewrite equations (14), (15), and (16) in terms of ΔT, the difference in time delays, as calculated in equation (4). From equation (4), $\Delta T=T_{12}-T_{23}$, and from equations (2) and (3), $T_{13}=T_{12}+T_{23}$. Using these results, equation (14) remains the same and equations (15) and (16) are rewritten as follows.

ti $R_{12}(T)=\text{sinc}\{Bw[T-(T_1-T_2)]\}=\text{sinc}[Bw(T-T_{12})],+\text{tm}$ (14)
ti $R_{23}(T)=\text{sinc}[Bw(T-T_{23})]=\text{sinc}[Bw(T-T_{12}\Delta T)]+\text{tm}$ (17)
ti $R_{13}(T)=\text{sinc}[Bw(T-T_{13})]=\text{sinc}[Bw(T-2T_{12}\Delta T)]+\text{tm}$ (18)

Adding equations (14), (17), and (18) results in an equation for a correlogram function of two variables, one variable being indicative of time delay, and the other variable being indicative of range. Adding equations (14), (17), and (18) in terms of variable time delays Q and δQ results in the following equation.

$$R_{123}(Q, \delta Q)=R_{12}(Q)+R_{23}(Q-\delta Q)+R_{13}(2Q-\delta Q). \quad (19)$$

wherein, time delay Q is a variable indicative of fine bearing and time delay δQ is a variable indicative of range.

Figure 8:
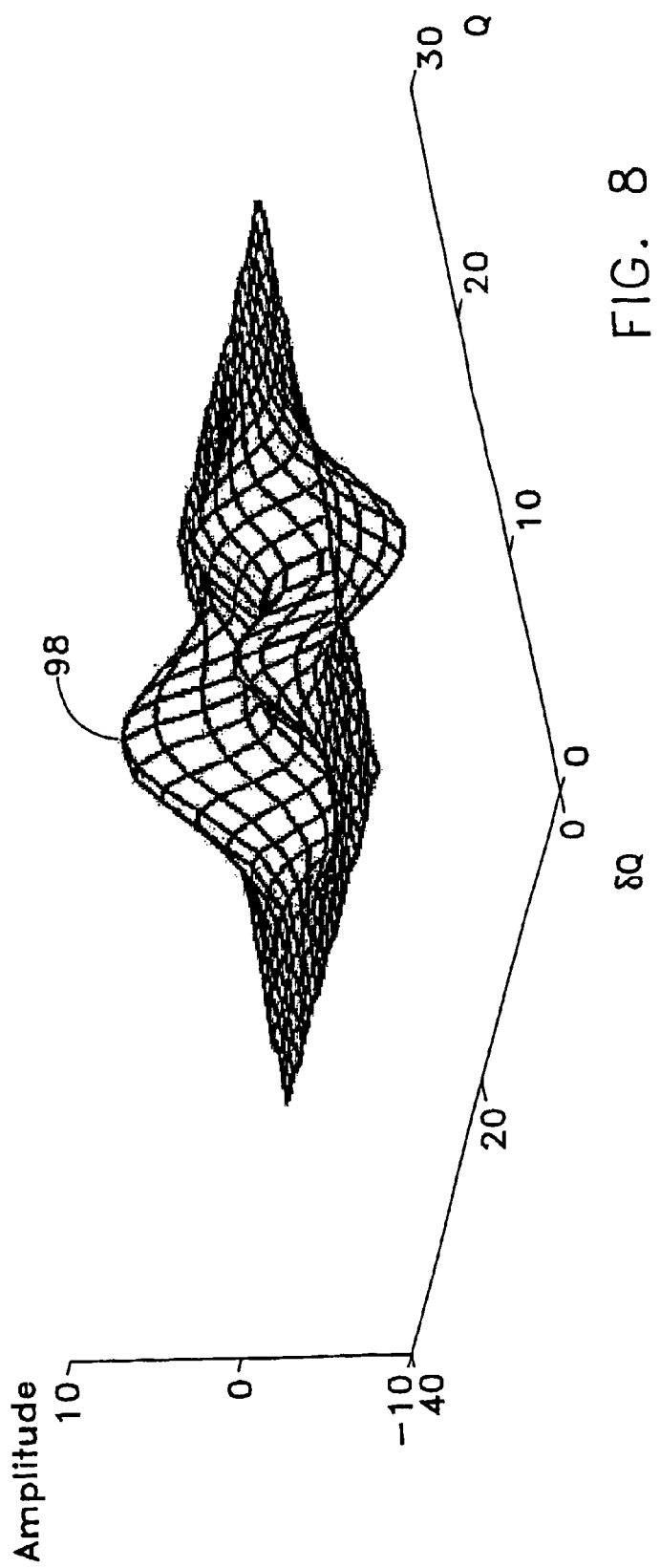
FIG. 8 is a three-dimensional plot of $R_{123}(Q, \delta Q)$ in accordance with an embodiment of the invention.

A plot of $R_{123}(Q, \delta Q)$ comprises a three-dimensional surface providing concurrent bearing, range to the signal source, and amplitude concurrently. FIG. 8 is an exemplary three-dimensional plot of $R_{123}(Q, \delta Q)$ in accordance with an embodiment of the invention. The range/bearing surface shown in FIG. 8 comprises range values, δQ, on a first axis, bearing values, Q, on a second axis (the second axis being orthogonal to the first axis), and the amplitude of the received signal at the corresponding range and bearing on a third axis (the third axis being orthogonal to the first and second axes). Analyzing equation (19) with respect to equations (14), (17), and (18), it can be seen that the peak 98 of equation (19) occurs at Q=$T_{12}$ and δQ =ΔT. Thus, the peak 98 of the three-dimensional surface, $R_{123}(Q, \delta Q)$, provides fine bearing ($T_{12}$) and range (ΔT) information at the same time. One advantage of the three-dimensional surface of $R_{123}(Q, \delta Q)$ formed in accordance with this exemplary embodiment of the present invention is that the three correlograms $R_{12}(T)$, $R_{23}(T)$, and $R_{13}(T)$ are coherently combined, thereby reducing the corruptive effect of noise introduced by each correlogram.

Equation (7) relates ΔT to range ($R_2$). Equation (14), (17), (18), and (19) model the function $R_{123}$ as functions of variables Q and δQ. Examining these equations along the correct fine bearing angle (i.e., T=$T_{12}$), the function $R_{123}$ becomes:

$$R_{123}(\delta Q)=1+2\cdot\text{sinc}[Bw(\Delta T-\delta Q)] \quad (20)$$

Figure 9:
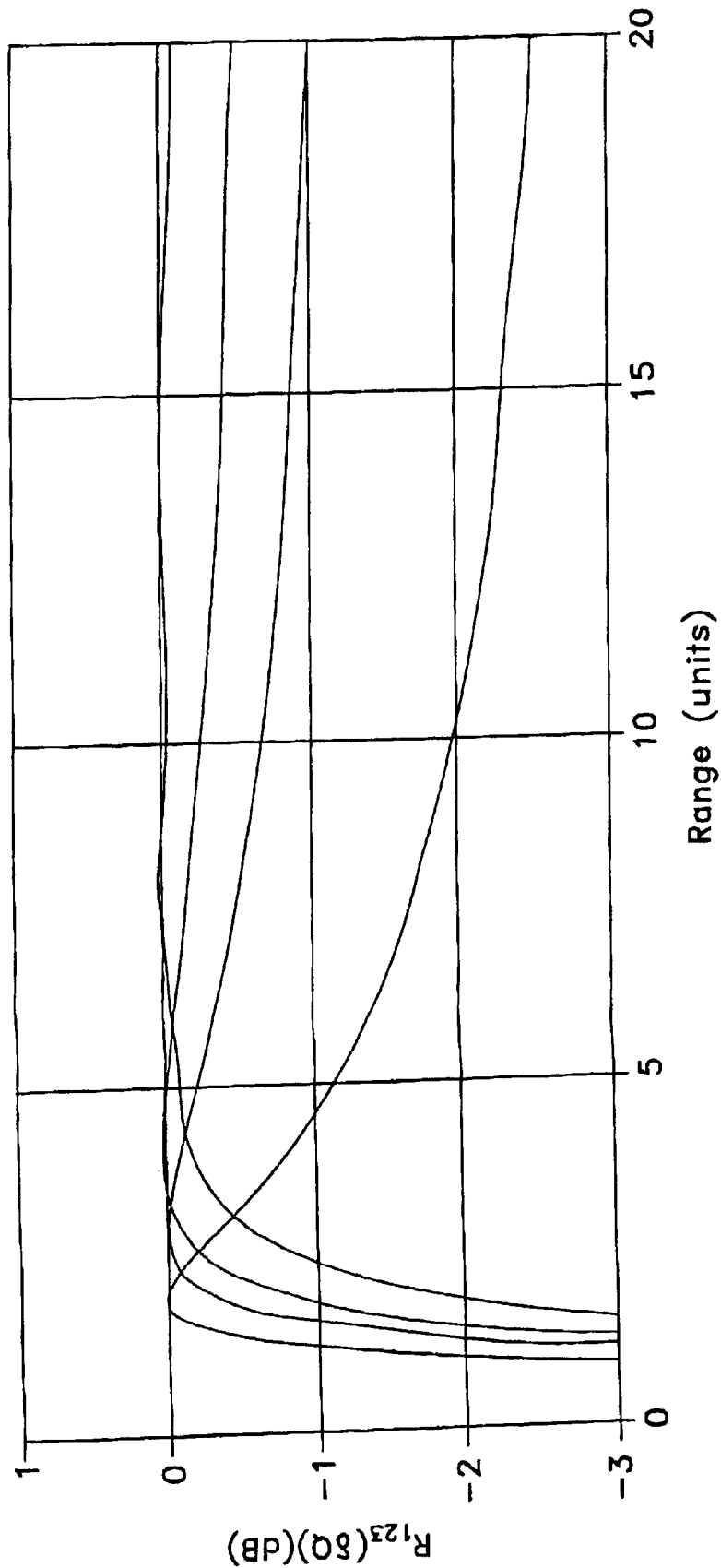
FIG. 9 is a graph of range versus $R_{123}$ in accordance with an exemplary embodiment of the present invention.
Figure 10:
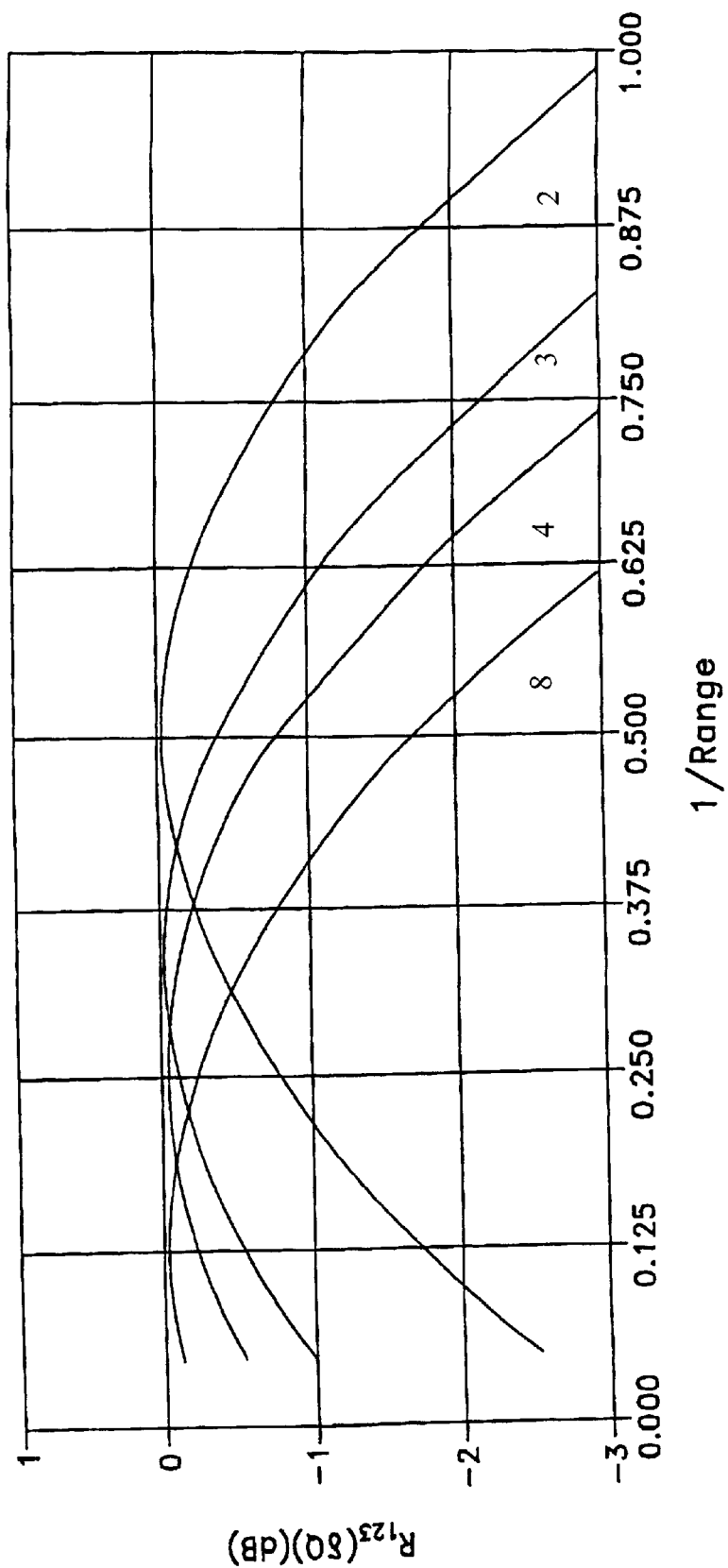
FIG. 10 is a graph of 1/range versus $R_{123}$ in accordance with an exemplary embodiment of the present invention.

A plot of $R_{123}$ versus range, $R_2$, is obtainable from equations (20) and (7). FIG. 9 is a graph of range versus $R_{123}$ and FIG. 10 is a graph of 1/range versus $R_{123}$ for an exemplary embodiment of the present invention. FIGS. 9 and 10 show the resulting response for four different range values (arbitrary units) 2, 3, 4, and 8. As can be seen from the graphs of FIGS. 9 and 10, the response sharpens (more accurate indication of range) in the near field. This is indicated by the width of the peak of the curve corresponding to range 2 being more narrow that the peak for the curve corresponding to the greater range 8.

Figure 11:
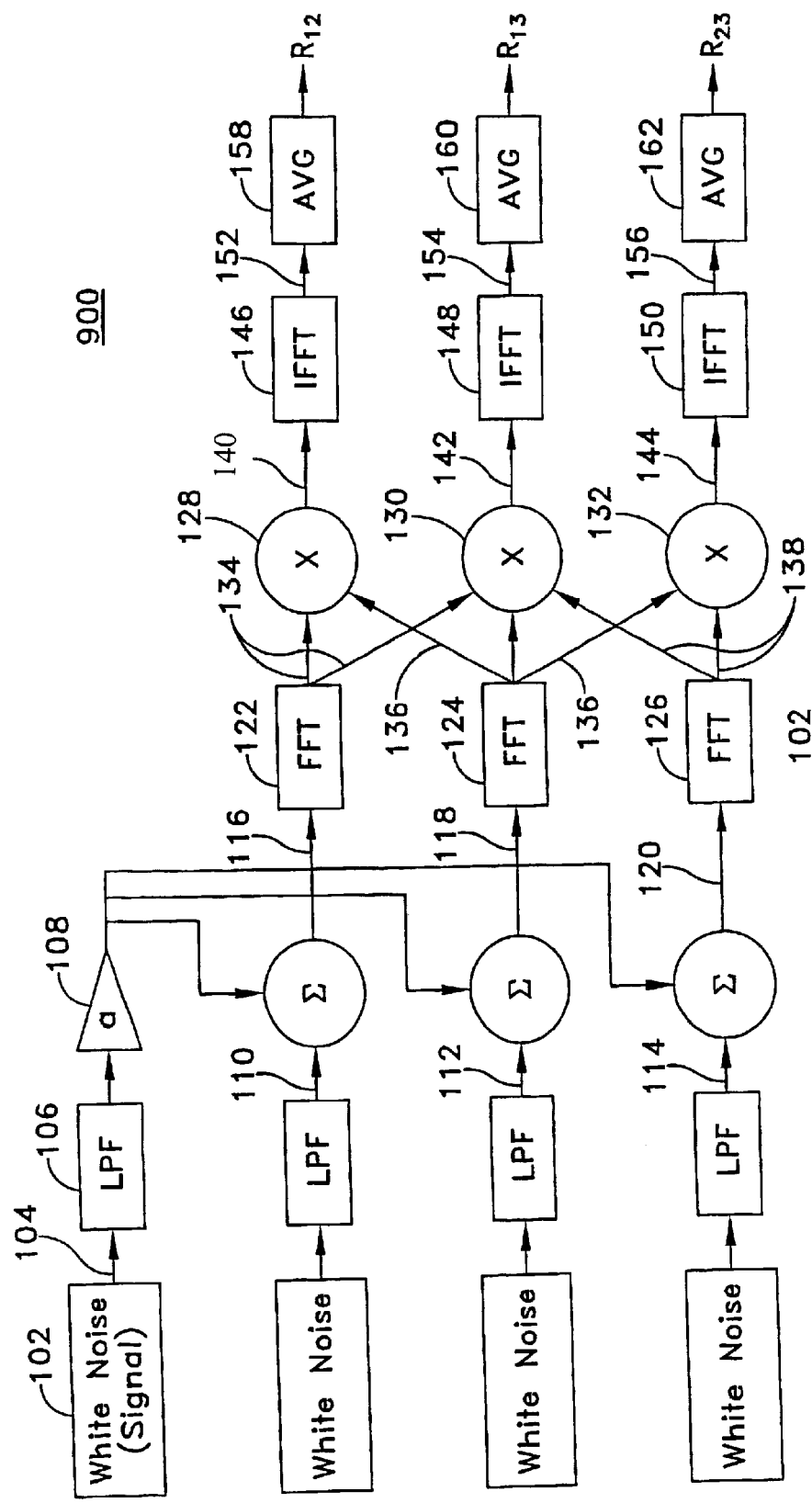
FIG. 11 is a functional block diagram of an exemplary simulation system 900 used to analyze performance of a system and process in accordance with an embodiment of the present invention.

A simulation was conducted to analyze the reduction of performance degradation by a system and process in accordance with the present invention, as compared to conventional processes. FIG. 11 is a functional block diagram of a simulation system 900 used to analyze performance. System 900 provides a colored noise signal 106 by creating white noise 104 with noise generator 102 and passing the white noise 104 through low pass filter (LPF) 106. The colored noise 106 is amplified by amplifier 108 and summed with signals 110, 112, and 114. Amplifier 108 controls the input signal to noise ratio (SNR) of the signal 106 to the noise signals 110, 112, and 114. Signal 106 has a spectrum similar to the rectangle function spectrum as described with respect to FIG. 7. Signal 110, 112, and 114 each comprise a spectrum having a shape similar to the spectrum of signal 106. Array data, such as from arrays 1, 2, and 3 depicted in FIG. 5, are simulated by signals 116, 118, and 120, respectively.

The simulated array signals 116, 118, and 120 are transformed to the frequency domain in accordance with the Fast Fourier Transform (FFT) algorithm by FFTs 122, 124, and 126, respectively. All combinations of pairs of the transformed signals 134, 136, and 138 are cross-correlated by multipliers 128, 130, and 132. As is well known in the art, correlation in the time domain is accomplished by multiplying the respective transformed signals in the frequency domain. The cross-correlated frequency domain signals 140, 142, and 144 are transformed to the time domain in accordance with the Inverse Fast Fourier Transform (IFFT) by inverse transformers 146, 148, and 150, respectively. Correlogram signals 152, 154, and 156 are averaged by averagers 158, 160, and 162, respectively to help "smooth" the output signals $R_{12}$, $R_{13}$, and $R_{23}$, respectively.

Figure 12:
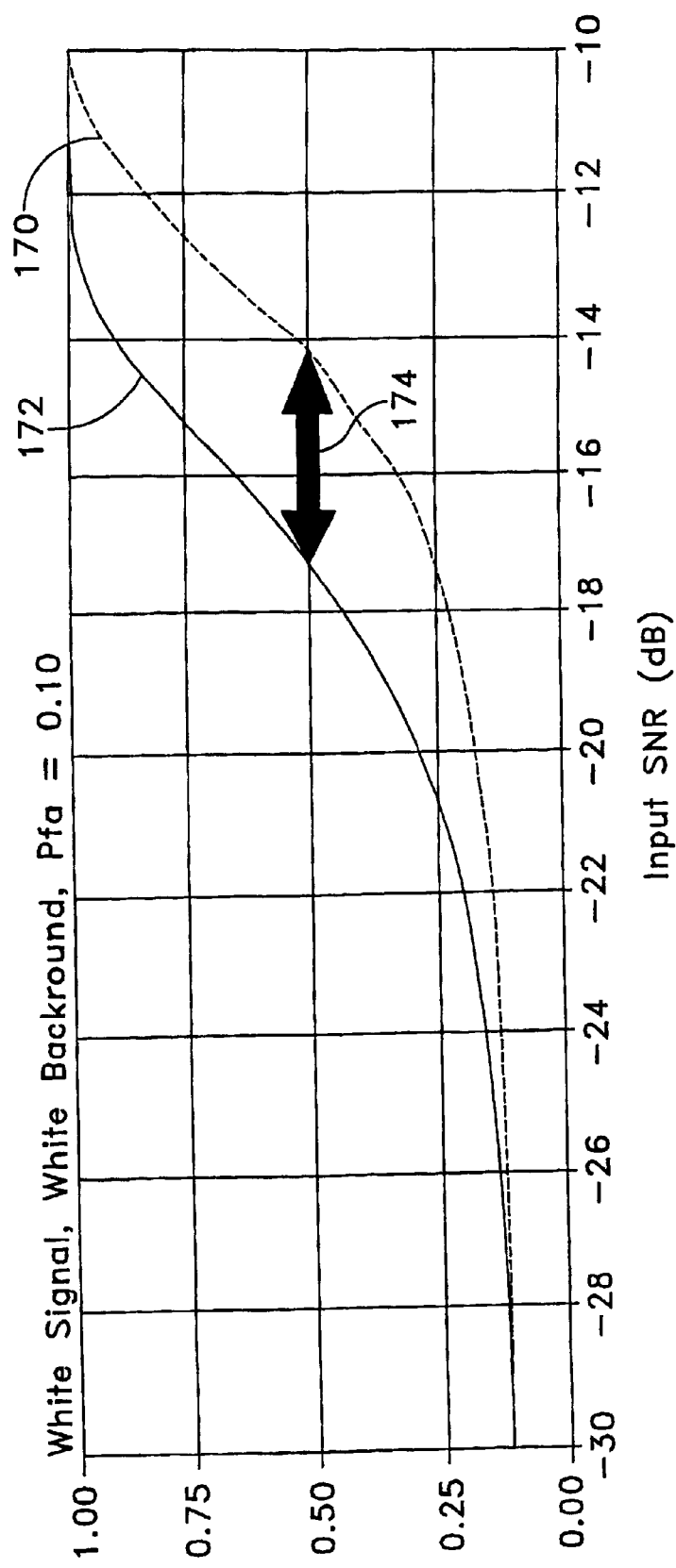
FIG. 12 is a receiver operating characteristic (ROC) showing the expected detection performance of a system and process in accordance with the present invention.

Detection statistics pertaining to input SNR and probability of detection were computed from cross-correlation data created by several "runs" of the simulator system 900. Running the simulator several times allows for computation of detection statistics in the signal's true range/bearing cell. FIG. 12 is a receiver operating characteristic (ROC) showing the expected detection performance of a system and process in accordance with the present invention. Curve 170 depicts the performance of a system that does not coherently delay and sum correlogram data. Curve 172 depicts the performance of a process and system in accordance with an exemplary embodiment of the present invention. Both curves 170 and 172 show input SNR versus probability of detection for a probability of false alarm (Pfa) of 0.10. As can be seen by arrow 174, for a probability of detection of 0.5, a system and process in accordance with the present invention has a theoretical improvement as compared to a convention system, of approximately 3 dB. This is the expected gain arising from coherent processing.

Figure 13A:
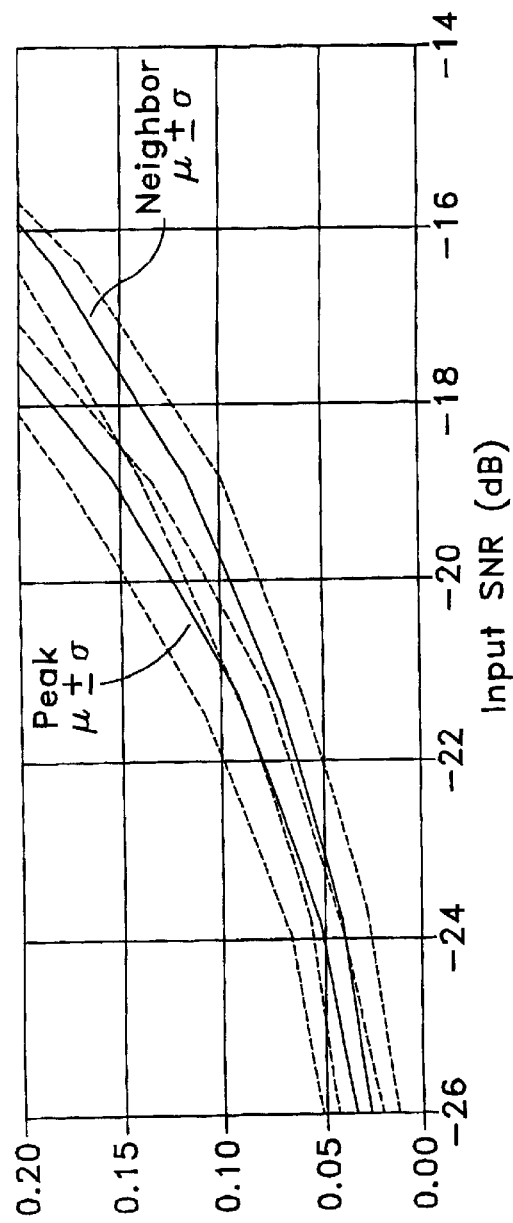
FIG. 13A is a graph of input SNR versus correlogram peak mean and deviation ($\mu \pm \sigma$) for a system, which does not coherently delay and sum correlogram data.
Figure 13B:
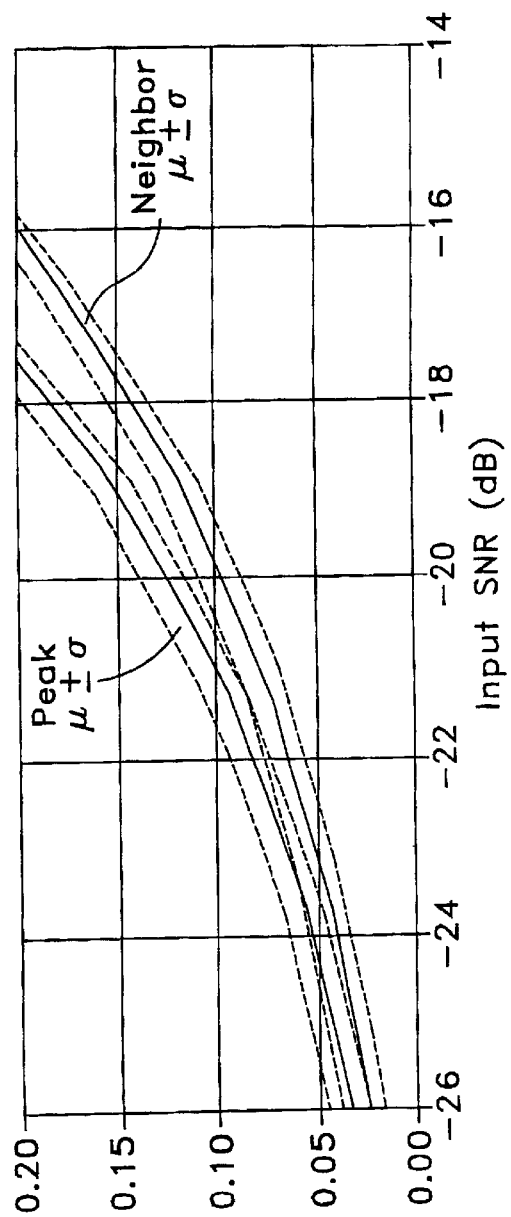
FIG. 13B is a graph of expected input SNR versus correlogram peak mean and deviation ($\mu \pm \sigma$) for an exemplary system and process in accordance with the present invention.

The simulation system 900 was also used to analyze the expected performance of a system and process in accordance with present invention, with respect to localizing correlogram peaks. FIG. 13A is a graph of input SNR versus correlogram peak mean and deviation ($\mu\pm\sigma$) for a conventional system and FIG. 13B is a graph of expected input SNR versus correlogram peak mean and deviation ($\mu\pm\sigma$) for an exemplary system and process in accordance with the present invention. Greater than 100 simulation trials were conducted to accumulate the data to create the plots in FIGS. 13A and 13B. Curves depicting the mean value of the correlogram peak and its neighbor (i.e., one sample away) are shown in solid lines. The standard deviation for each of these mean values is shown by dashed lines. Accurate localization of the peak value becomes more difficult as the mean and standard deviation of the neighbor approaches the mean of the peak. As shown in FIG. 13A, for a convention system, this occurs at approximately −21 dB. However, as shown in FIG. 13B, for a system and process in accordance with the present invention, the simulation shows that this occurs at approximately −24 dB. Thus, due the smaller standard deviation value of the neighbor, a system and process in accordance with the present invention is expected to localize weak peak values greater than or equal to approximately −24 dB.

Figure 14A:
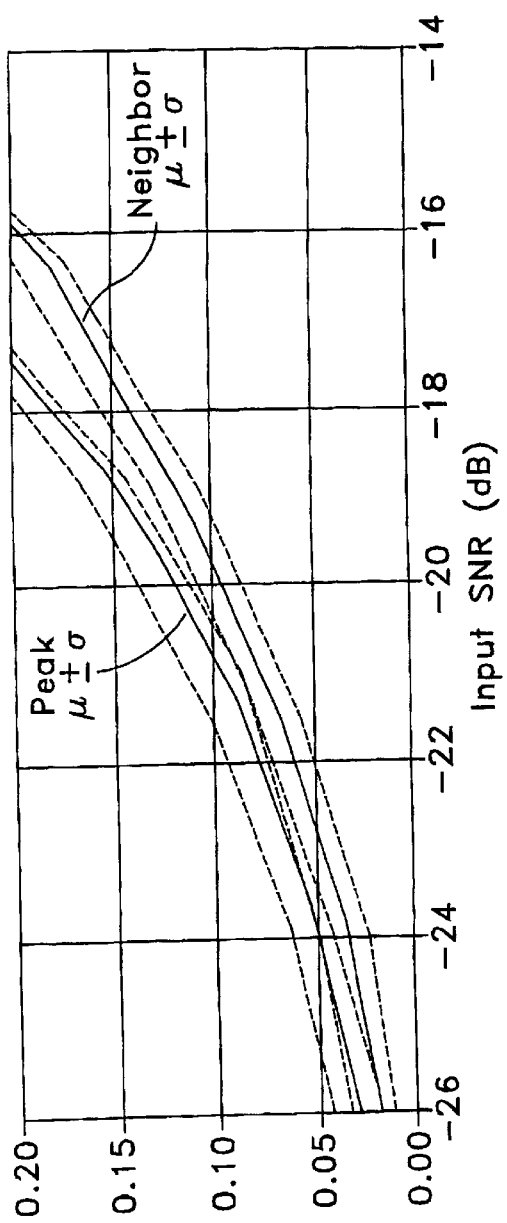
FIG. 14A is a graph of input SNR versus mean and standard deviation for range cells combined by peak-picking in accordance with an exemplary embodiment of the invention.
Figure 14B:
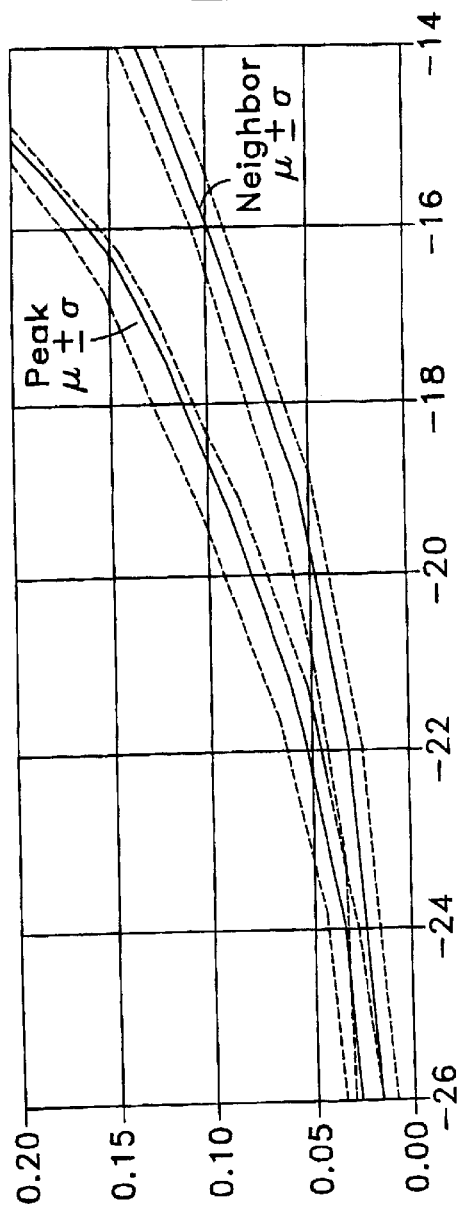
FIG. 14B is a graph of input SNR versus mean and standard deviation for averaged range cells in accordance with an exemplary of the invention.

In an alternate embodiment of the invention, data across range ($\delta Q$) is combined from the three-dimensional function $R_{123}$. FIG. 14A and FIG. 14B are graphs of input SNR versus mean and standard deviation ($\mu\pm\sigma$) for range cells combined by peak-picking and averaging, respectively, in accordance with an exemplary of the invention. FIG. 14A shows the results of picking the largest value across four range, $\delta Q$, cells. FIG. 14B shows the results of averaging across the same four range cells. As can be seen by comparing FIG. 14A with FIG. 14B, the averaging approach (FIG. 14B) better separates the peak value from the neighbor than the peak-picking approach (FIG. 14A). However, the averaging approach also degrades the peak mean. Thus in an exemplary embodiment of the invention, the peak-picking approach is used for stronger signals, and the averaging approach is used for stronger signals.

Figure 15:
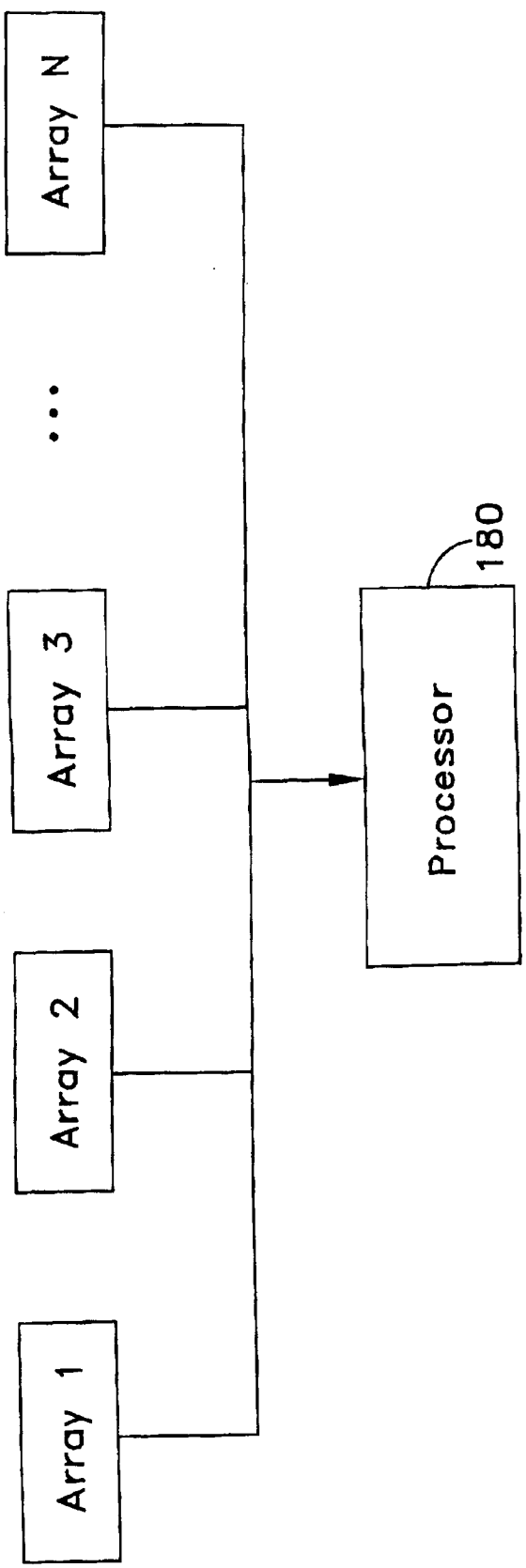
FIG. 15 is a block diagram of a system comprising a plurality of co-linear sensor arrays and a computer processor in accordance with an embodiment of the invention.

The present invention may be embodied in the form of computer-implemented processes and apparatus for practicing those processes. FIG. 15 is a block diagram of a system comprising a plurality of co-linear sensor arrays, arrays 1 through N, and a computer processor 180, in accordance with an exemplary embodiment of the invention. Signals are received by arrays 1 through N. Array data representing the received signals are provided to processor 180. Processor 180 performs the functions of beamforming, correlating, coherently delaying and combining, and localizing in accordance with various embodiments of the present invention. Processing may also be performed by special purpose hardware.

The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 180, the computer processor 180 becomes an apparatus for practicing the invention. The present invention may also be embodied in the form of computer program code, for example, whether stored in a storage medium, loaded into and/or executed by computer processor 180, or transmitted over some transmission medium, such as over electrical wiring or cabling, through fiber optics, or via electromagnetic radiation, wherein, when the computer program code is loaded into and executed by computer processor 180, the computer processor 180 becomes an apparatus for practicing the invention. When implemented on a general-purpose processor, the computer program code segments configure the processor to create specific logic circuits.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for localizing a target using a plurality of co-linear arrays of sensors, said method comprising the steps of:

forming respective beam pattern signals for each of said plurality of arrays;

coherently cross-correlating said beam pattern signals for providing respective correlogram signals;

time delaying each correlogram signal in accordance with a respective expected time delay; and coherently summing said time delayed correlogram signals for localizing said target.

2. A method in accordance with claim 1, wherein said sensors comprise one of acoustic sensors and electromagnetic sensors.

3. A method in accordance with claim 1, further comprising the step of localizing said target by determining at least one of a range to said target and a bearing to said target.

4. A method in accordance with claim 1, further comprising the step of forming a three-dimensional surface for providing concurrent bearing to said target, range to said target, and amplitude of a signal corresponding to said range and bearing received by said co-linear arrays, wherein range values are indicated on a first axis, bearing values are indicated on a second axis, said second axis being orthogonal to said first axis, and amplitude values are indicated on a third axis, said third axis being orthogonal to said first and said second axes.

5. A method in accordance with claim 4, further comprising the step of combining range values in accordance with at least one of peak-picking and averaging.

6. A method in accordance with claim 1, wherein all combinations of pairs of beam pattern signals are cross-correlated.

7. A method in accordance with claim 1, wherein each correlogram signal is time delayed in accordance with its respective peak correlogram value.

8. A system for localizing a target using a plurality of co-linear arrays of sensors, said system comprising:
- a beamformer for forming respective beam pattern signals for each of said plurality of array;
- a cross-correlator for coherently cross-correlating said beam pattern signals for providing respective correlogram signals;
- a time delayer for time delaying each correlogram signal in accordance with a respective expected time delay; and
- a summer for coherently summing said time delayed correlogram signals for detecting said target.

9. A system in accordance with claim 8, wherein said sensors comprise one of acoustic sensors and electromagnetic sensors.

10. A system in accordance with claim 8, further comprising a surface former for forming a three-dimensional surface for providing concurrent bearing to said target, range to said target, and amplitude of a signal corresponding to said range and bearing received by said co-linear arrays, wherein range values are indicated on a first axis, bearing values are indicated on a second axis, said second axis being orthogonal to said first axis, and amplitude values are indicated on a third axis, said third axis being orthogonal to said first and said second axes.

11. A system in accordance with claim 10, further comprising a combiner for combining range values in accordance with at least one of peak-picking and averaging.

12. A system in accordance with claim 8, wherein all combinations of pairs of beam pattern signals are cross-correlated.

13. A system in accordance with claim 8, wherein each correlogram signal is time delayed in accordance with its respective peak correlogram value.

14. A computer readable medium having embodied thereon a computer program for causing a computer to localize a target using a plurality of co-linear arrays of sensors, said computer readable program comprising:
- means for causing said computer to form respective beam pattern signals for each of said plurality of arrays;
- means for causing said computer to coherently cross-correlate said beam pattern signals for providing respective correlogram signals;
- means for causing said computer to time delay each correlogram signal in accordance with a respective expected time delay; and
- means for causing said computer to coherently sum said time delayed correlogram signals for detecting said target.

15. A computer readable medium in accordance with claim 14, wherein said sensors comprise one of acoustic sensors and electromagnetic sensors.

16. A computer readable medium in accordance with claim 14, wherein said computer program further comprises means for causing said computer to localize said target by determining at least one of a range to said target and a bearing to said target.

17. A computer readable medium in accordance with claim 14, wherein said computer program further comprises means for causing said computer to form a three-dimensional surface for providing concurrent bearing to said target, range to said target, and amplitude of a signal corresponding to said range and bearing received by said co-linear arrays, wherein range values are indicated on a first axis, bearing values are indicated on a second axis, said second axis being orthogonal to said first axis, and amplitude values are indicated on a third axis, said third axis being orthogonal to said first and said second axes.

18. A computer readable medium in accordance with claim 17, wherein said computer program further comprises means for causing said computer to combine range values in accordance with at least one of peak-picking and averaging.

19. A computer readable medium in accordance with claim 14, wherein said computer program comprises means for causing said computer to cross-correlate all combinations of pairs of beam pattern signals.

20. A computer readable medium in accordance with claim 14, wherein said computer program comprises means for causing said computer to time delay each correlogram signal in accordance with its respective peak correlogram value.

21. A method for detecting and localizing data received on multiple co-linear arrays, said method comprising the steps of:
- beam forming each array to provide respective patterns indicative of a specified look direction;
- coherently cross-correlating said beam patterns for providing respective correlogram signals;
- combining said correlogram signals to form a three-dimensional range/bearing surface;
- steering said correlogram signals to a specific range/bearing cell on said surface indicative of desired data; and
- detecting said data after said steering said correlogram signals to said cell.

* * * * *